US009419734B2

(12) United States Patent
Abouchakra et al.

(10) Patent No.: US 9,419,734 B2
(45) Date of Patent: Aug. 16, 2016

(54) ENHANCED RADIO

(75) Inventors: Lama R. Abouchakra, Apex, NC (US); Al Chakra, Apex, NC (US); Lisa Seacat DeLuca, San Francisco, CA (US); Ravi K. Kosaraju, Middle Island, NY (US); Julie A. Meserve, Raleigh, NC (US); Stephen M. Meserve, Raleigh, NC (US); Steven M. Miller, Cary, NC (US); Mark E. Peters, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 12/484,300

(22) Filed: Jun. 15, 2009

(65) Prior Publication Data

US 2010/0317304 A1 Dec. 16, 2010

(51) Int. Cl.

| | |
|---|---|
| ***H04B 7/08*** | (2006.01) |
| ***H04H 40/18*** | (2008.01) |
| ***H04H 20/10*** | (2008.01) |
| ***H04H 20/26*** | (2008.01) |

(52) U.S. Cl.

CPC ............. *H04H 40/18* (2013.01); *H04H 20/106* (2013.01); *H04H 20/26* (2013.01); *H04H 2201/60* (2013.01)

(58) Field of Classification Search

CPC .................. H04N 21/23418; H04N 21/23424; H04N 21/4667; H04N 21/6581

USPC .......................................................... 455/132

See application file for complete search history.

(56) References Cited

U.S. PATENT DOCUMENTS

| | | | | |
|---|---|---|---|---|
| 4,756,023 A * | 7/1988 | Kojima | H04B 7/082 455/132 |
| 5,864,753 A | 1/1999 | Morita et al. | |
| 6,611,678 B1 * | 8/2003 | Zweig | H03J 1/0075 455/161.3 |
| 6,704,553 B1 | 3/2004 | Eubanks | |
| 6,725,022 B1 * | 4/2004 | Clayton | G01C 21/362 455/150.1 |
| 6,925,289 B2 | 8/2005 | Fukushima | |
| 2007/0143816 A1 * | 6/2007 | Gupta | H04H 60/46 725/135 |

* cited by examiner

*Primary Examiner* — Ajibola Akinyemi

(74) *Attorney, Agent, or Firm* — Jordan IP Law, LLC

(57) ABSTRACT

A system and method of controlling a portable radio may involve tuning a first receiver of the portable radio to a first broadcast from a first station, where the first broadcast includes specific program content. A switching event can be detected at the portable radio, where a second receiver of the portable radio may be tuned to a second broadcast from a second station in response to the switching event. The second broadcast can include the specific program content.

19 Claims, 3 Drawing Sheets

FIG. 1
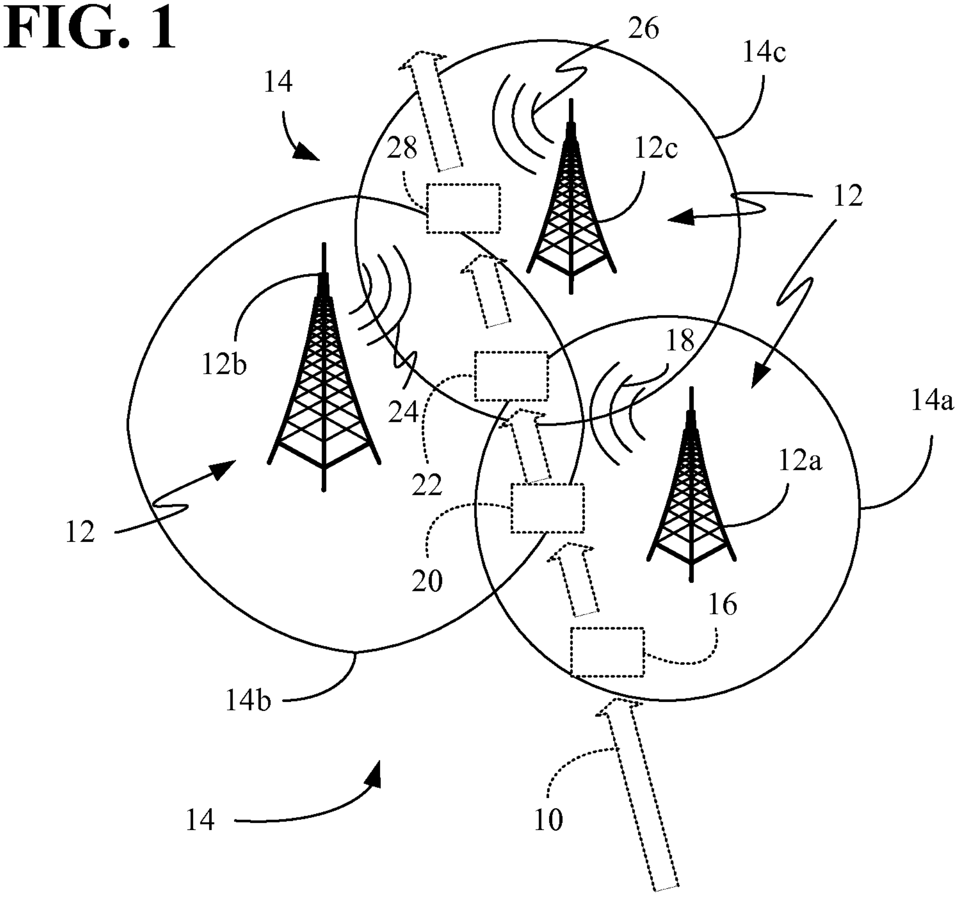
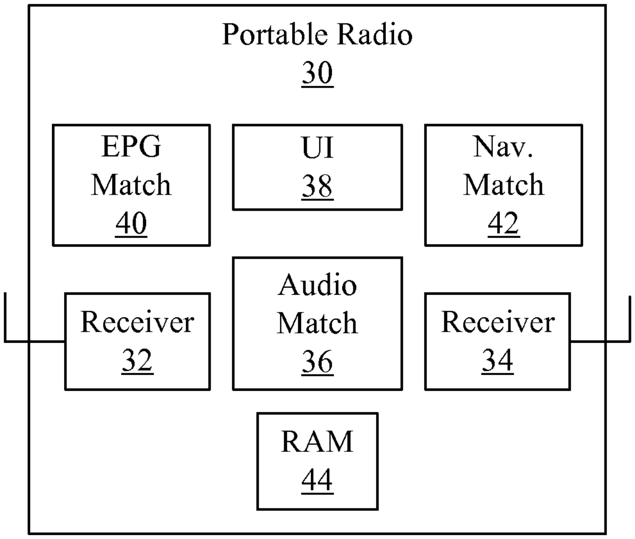
FIG. 2

FIG. 3
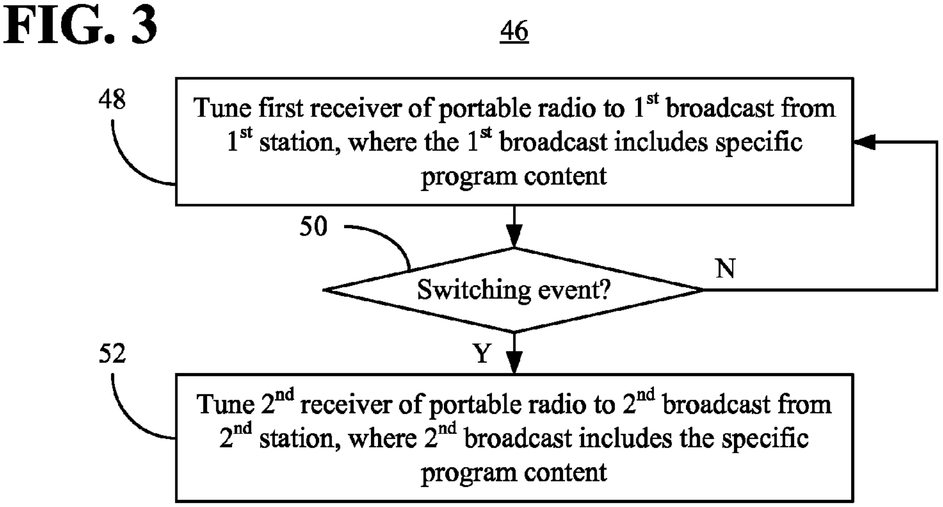
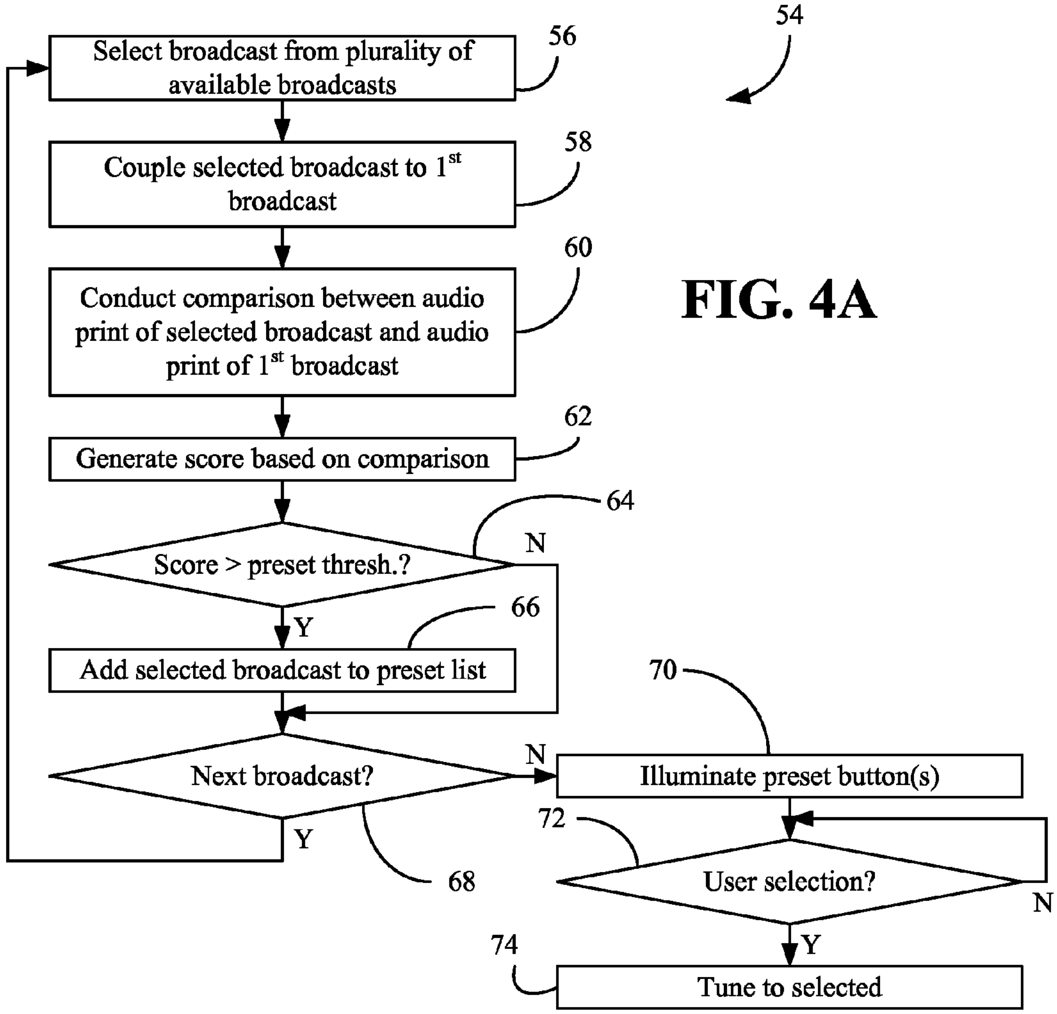
FIG. 4A

ENHANCED RADIO

BACKGROUND

1. Technical Field

Embodiments of the present invention generally relate to receiving radio station broadcasts. More particularly, embodiments of the invention relate to identifying radio station broadcasts that have the same program content.

2. Discussion

Radio receivers have enabled users to enjoy frequency modulated (FM) and amplitude modulated (AM) broadcasts for many years. The typical receiver may have a dial, which permits the user to individually select specific reception frequencies, and a number of preset buttons, which permit the user to identify favorite reception frequencies. In the case of conventional portable radio receivers, however, a number of challenges remain. In particular, as the radio receiver travels from one geographic area to another, the signal quality for a given broadcast may deteriorate due to increased distance from the station transmitter, interference, or other considerations. Although the same program content may be available on a different broadcast in the new area, it can be difficult for the user to locate the content quickly enough to avoid missing a substantial portion of the content.

BRIEF SUMMARY

Embodiments of the present invention provide for a computer-implemented method that involves tuning a first receiver of a portable radio to a first broadcast from a first station, where the first broadcast includes specific program content. A switching event may be detected, where the method can provide for tuning a second receiver of the portable radio to a second broadcast from a second station in response to the switching event. The second broadcast may include the specific program content.

Embodiments of the present invention also provide for a computer program product having a computer readable medium and computer usable code stored on the computer readable medium. If executed by a processor, the computer usable code can cause a computer to tune a first receiver of a portable radio to a first broadcast from a first station, where the first broadcast is to include specific program content. A switching event may be detected where the computer usable code can cause a computer to tune a second receiver of the portable radio to a second broadcast from a second station in response to the switching event. The second broadcast may include the specific program content.

Other embodiments of the present invention may also provide for a computer program product having a computer readable medium and computer usable code stored on the computer readable medium, where, if executed by a processor, the computer usable code can cause a computer to tune a first receiver of a portable radio to a first broadcast from a first station. The first broadcast may include specific program content. A switching event can be detected at the portable radio, where a broadcast can be selected from a plurality of available broadcasts in response to the switching event. The selected broadcast may be coupled to the first broadcast and a comparison may be conducted between an audio print of the selected broadcast and an audio print of the first broadcast. A score may be generated based on the comparison, where the selected broadcast can be added to a preset list if the score exceeds a preset threshold. The selecting, coupling, conducting, generating and adding may be repeated for each broadcast in the plurality of available broadcasts. The computer usable code may also provide for illuminating a plurality of preset buttons based on the preset list.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 1 is a block diagram of an example of a portable radio switching scheme according to an embodiment of the present invention;

FIG. 2 is a block diagram of an example of a portable radio according to an embodiment of the present invention;

FIG. 3 is a flowchart of an example of a method of controlling a portable radio according to an embodiment of the present invention; and FIGS. 4A-4C are flowcharts of examples of methods of tuning a portable radio to an alternative broadcasts according to various embodiments of the present invention.

DETAILED DESCRIPTION

Figure 4B:
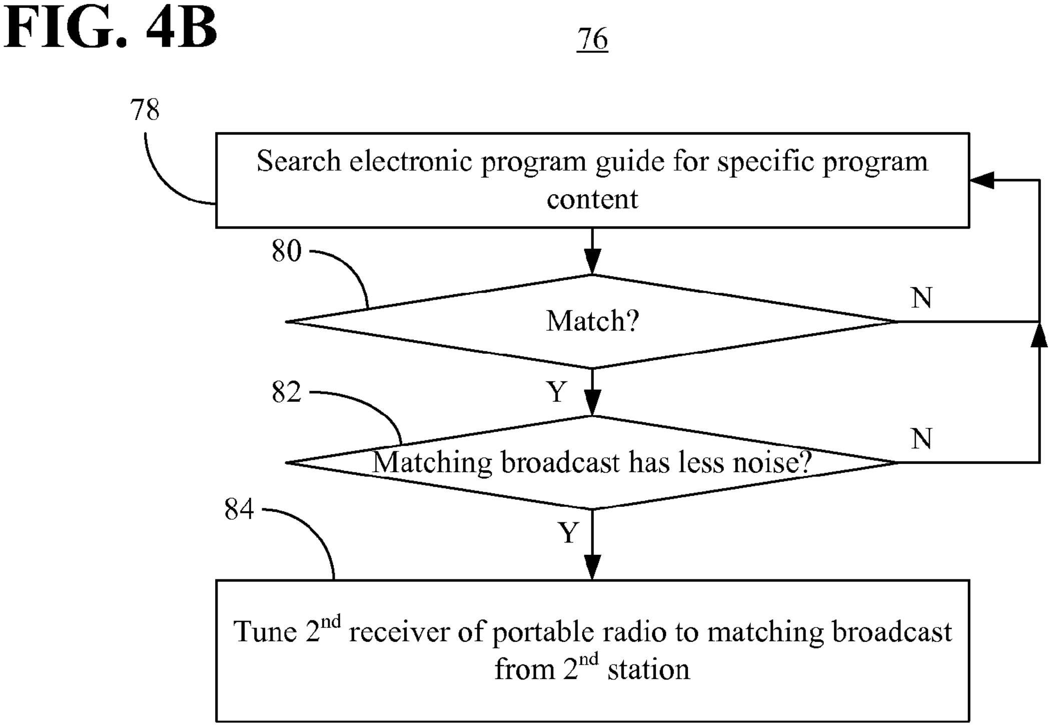

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be punch-card, paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1, a travel route 10 of a portable radio is shown in which the radio passes through the service areas 14 (14*a*-14*c*) of multiple station transmitters 12 (12*a*-12*c*), respectively. For example, the portable radio could be coupled to a vehicle where the travel route 10 might include a trip from one location to another (e.g., Outer Banks, N.C. to Philadelphia, Pa.) in which multiple metropolitan and/or rural areas are encountered on the trip. In the illustrated example, when in location 16 the portable radio is able to receive broadcast 18, which includes specific program content such as a talk show hosted by a certain radio personality or a particular song. As the portable radio continues along the travel route to location 20, the signal quality of the broadcast 18 may begin to deteriorate due to a number of factors such as distance from the station transmitter 12*a*, interference, weather conditions, etc. At this location, the portable radio may also gain the ability to receive the broadcast 24 of station transmitter 12*b* due to their relative proximity. The broadcast 24 may include the same program content of the broadcast 18, even though the transmitters 12*b* and 12*a* may be owned and/or operated by different entities.

Indeed, it is not uncommon for certain programs to be nationally syndicated and available in most geographic locations. Thus, if the same program content is available from both broadcasts, at location 20 the portable radio may determine, either automatically or at the request of the user, whether to switch from receiving the content via the broadcast 18 of the station transmitter 12, to receiving the content via the broadcast 24 of the station transmitter 12*b*. As discussed in greater detail below, this determination may take into the consideration a number of factors such as the relative strengths of the two broadcasts, how close in play time the programs are, user preferences, and so on. For example, the portable radio may determine at location 20 that the signal quality of the broadcast 18 has not fallen below a predetermined noise switching threshold, and could therefore remain tuned to the broadcast 18.

At location 22, the signal quality of the broadcast 18 might fall below the noise switching threshold (or the user could simply request that the portable radio find a higher quality transmission of the program content in question). In such a case, the portable radio might determine whether to switch to the broadcast 24 of the station transmitter 12*b* or to the broadcast 26 of the station transmitter 12*c*, which is now also in range, or to any other available broadcast. In fact, there are likely to be numerous station broadcasts in range of the portable radio at any given moment, and the illustrated example has been simplified to facilitate discussion. At location 22, the portable radio may determine that the broadcast 26 of the station transmitter 12*c* does not include the same program content as the broadcast 18 of the station transmitter 12*a*, but that the broadcast 24 of the station transmitter 12*b* does. In such a case, the portable radio may begin receiving the same program content via the broadcast 24, and the user is not required to search for the corresponding frequency or preprogram the corresponding frequency before embarking on the trip. As the portable radio continues to location 28 and along the remaining travel route 10, the above-described approach can be used to continually present the user with the desired program content at the highest quality level available.

FIG. 2 shows a portable radio 30 having a set of receivers 32, 34, capable of receiving radio broadcasts. The receivers 32, 34, may each have a radio frequency (RF) front end with an antenna, frequency oscillation, mixing, and/or filtering functionality, an analog to digital (A/D) converter, and other well known components. These components can be implemented in hardware, software, or any combination thereof, as appropriate. The illustrated radio 30 also includes an audio matching module 36 that is able to analyze, compare and generate scores for the signals obtained from the receivers 32, 34. Thus, the audio matching module 36 may indicate to the portable radio 30 that a particular broadcast has fallen below a switching noise level, or that two separate broadcasts contain the same or similar program content. Based on this information, the portable radio 30 might automatically switch broadcasts or could control a user interface (UI) 38 to prompt the user with one or more switching options.

The illustrated radio 30 also includes an electronic program guide (EPG) matching module that is able to retrieve and/or construct an EPG based on the available broadcasts, search the EPG for specific program content, and determine whether the noise level of a broadcast currently being received exceeds the noise level of any matching broadcasts found in the search of the EPG. Retrieval of the EPG could involve communicating with an off board system or conducting a simple read operation from a particular memory location. Construction of the EPG might involve analyzing radio data system (RDS, e.g., European Broadcasting System) information or radio broadcast data system (RBDS, e.g., U.S. System) information to identify program content.

The radio 30 may further include a navigation matching module 42 that is able to retrieve and/or construct a navigation profile based on the travel route, search the navigation profile for specific program content or content genres, and determine whether the noise level of a broadcast currently being received exceeds the noise level of any matching broadcasts found in the search of the navigation profile. The illustrated radio 30 also includes a random access memory (RAM) 44, which is used to synchronize the two broadcasts involved in the switching procedure. In particular, if the current broadcast is farther along in the program than the new broadcast, the radio 30 may write the audio to the RAM 44 in order to induce a delay in the program so that the user does not hear a "blip" upon transitioning between broadcasts.

Turning now to FIG. 3, a method 46 of controlling a portable radio is shown. The method 46 may be implemented in a vehicle on board computer, microcontroller, or portable radio such as the portable radio 30 (FIG. 2), already discussed. In the illustrated example, processing block 48 provides for tuning a first receiver of a portable radio to a first broadcast from a first station, where the first broadcast includes specific program content. As already noted, the program content might be a National Public Radio (NPR) talk show or a particular song. If a switching event is detected at block 50, a second receiver of the portable radio may be tuned to a second broadcast from a second station at block 52. Detection of the switching event could involve receiving a user request to locate the specific program content on a station other than the first station, or determining that a noise level of the first broadcast exceeds a noise switching threshold. In the illustrated example, the second broadcast includes the specific program content. Once the program is over, the method 46 may also provide for retuning the portable radio to the first broadcast, if the broadcast is available.

As already noted, the tuning of the second receiver to the second broadcast can be implemented in a variety of ways. For example, FIG. 4A demonstrates a process 54 of tuning the second receiver to the second broadcast in which a preset list is generated based on an audio matching procedure. Thus, process 56 may be readily substituted for block 52 (FIG. 3), already discussed, and portions of the process 56 could be implemented in the audio matching module 36 (FIG. 2), also already discussed. In particular, a broadcast may be selected from a plurality of available broadcasts at block 56 and the selected broadcast can be coupled to the first broadcast at block 58. Alternatively, blocks 56 and 58 might be conducted continuously regardless of whether the switching event determination at block 50 (FIG. 3) has been made. Such a solution may provide for faster operation and slower switching times. Illustrated block 60 provides for conducting a comparison between an audio print of the selected broadcast and an audio print of the first broadcast, where a score can be generated at block 62 based on the comparison. If it is determined at block 64 that the score exceeds a preset threshold, illustrated block 66 adds the selected broadcast to a preset list.

Block 68 provides for iteratively evaluating each available broadcast by repeating the selecting, coupling, generating and adding for each broadcast in the plurality of available broadcasts. Once the closest matches have been accumulated, illustrated block 70 provides for illuminating a plurality of preset buttons based on the preset list. For example, the buttons, which may be physical buttons or soft buttons, could be assigned different colors to indicate the strength of the match in question. Block 72 can provide for determining whether the user has selected a preset button (or manually tuned to another station broadcast), where illustrated block 74 provides for tuning the second receiver to the selected preset option.

FIG. 4B demonstrates a process 76 of tuning the second receiver to the second broadcast in which an EPG is used. Accordingly, portions of the process 76 may be readily substituted for block 52 (FIG. 3), already discussed, and some or all of the process 76 could be implemented in the EPG matching module 40 (FIG. 2), also already discussed. In particular, illustrated block 78 provides for searching an EPG for the specific program content currently being received from the first radio station. If it is determined at block 80 that the program content is found in the EPG, block 82 can provide for determining whether the noise level of the first broadcast exceeds the noise level of the second broadcast. If so, the second receiver can be tuned to matching broadcast at block 84.

Figure 4C:
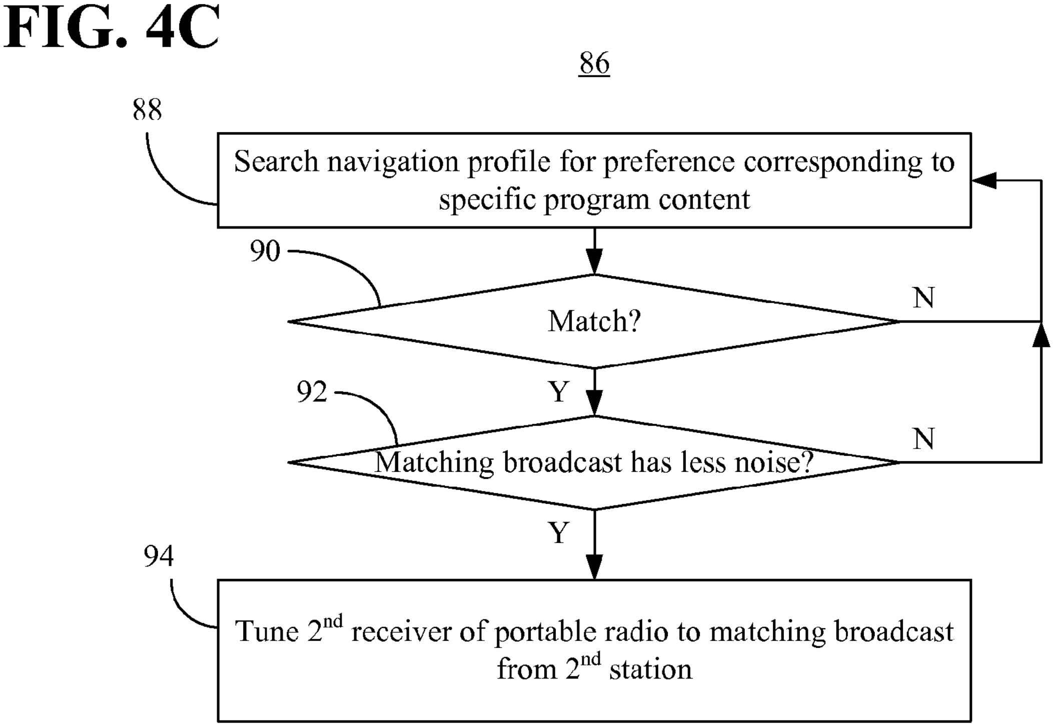

Turning now to FIG. 4C, a process 86 of tuning the second receiver to the second broadcast using a navigation profile is shown. Accordingly, portions of the process 86 may be readily substituted for block 52 (FIG. 3), already discussed, and some or all of the process 86 could be implemented in the navigation matching module 42, also already discussed. In particular, illustrated block 88 provides for searching a navigation profile for a preference corresponding to the specific program content.

For example, the navigation profile could include information regarding a travel route such as the route 10 (FIG. 1), which could be obtained from a telematics unit or global positioning system (GPS) unit coupled to the vehicle carrying the portable radio, from an online mapping service such as Google maps, or from any other suitable navigation service. The navigation profile could also include an indication of the radio stations expected to be encountered during the trip and user genre preferences that may be used to filter the list of expected radio stations. The preferences may also be used to filter the individual programs to be broadcast by these stations. Thus, block 88 might determine that the current broadcast fits into a particular genre and search the navigation profile for program content being broadcast in the same geographic area that also fits into the same genre. Block 88 may also attempt to identify the same program content within the navigation profile. If illustrated block 90 determines that the second broadcast satisfies the preference corresponding to the specific program content, block 92 may determine if the first broadcast exceeds a noise level of the second broadcast. If so, the second receiver of the portable radio may be tuned to the matching broadcast.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer-implemented method comprising:

tuning a first receiver of a portable radio to a first broadcast from a first station, the first broadcast including a specific program within a genre with audio of an individual associated with the specific program;

detecting a switching event at the portable radio including determining one or more of receiving a user request to locate the specific program on a station other than the first station and a noise level of the first broadcast that indicates signal quality of the first broadcast exceeds a noise switching threshold;

scanning to detect a plurality of available broadcasts in response to the switching event;

conducting a comparison between an audio print of the available broadcasts and an audio print of the first broadcast based at least in part on the specific program within the genre with the audio of the individual to determine one or more closest matches;

generating a score based on the comparison;

adding a selected broadcast to a preset list if the score exceeds a preset threshold to accumulate the one or more closest matches;

assigning different colors to a plurality of station buttons based on the preset list to indicate a strength of match; and one or more of:

automatically tuning a second receiver of the portable radio to a second broadcast from a second station in response to the switching event and based at least in part on the one or more closest matches and a comparison of a noise level of the first broadcast that indicates the signal quality of the first broadcast to a noise level of the second broadcast that indicates signal quality of the second broadcast, wherein the second broadcast has an audio print similar to an audio print of the first broadcast based at least in part on the specific program within the genre with the audio of the individual that is included in the first broadcast and the second broadcast; and tuning the second receiver of the portable radio to the second broadcast from the second station in response to a request by a user via a user interface that prompts the user with one or more switching options including illuminating the plurality of station buttons with the different colors to indicate the strength of match.

2. The computer-implemented method of claim 1, wherein tuning the second receiver to the second broadcast includes:

selecting a broadcast from the plurality of available broadcasts; and coupling the selected broadcast to the first broadcast.

3. The computer-implemented method of claim 2, further including repeating the selecting, coupling, conducting, generating and adding for each broadcast in the plurality of available broadcasts.

4. The computer-implemented method of claim 3, further including illuminating a plurality of preset buttons with the different colors based on the preset list to indicate the strength of match.

5. The computer-implemented method of claim 1, wherein tuning the second receiver to the second broadcast includes:

searching an electronic program guide for the specific program; and tuning the second receiver to the second broadcast if the specific program is found in the electronic program guide and a comparison of the noise level of the first broadcast to the noise level of the second broadcast establishes the noise level of the first broadcast exceeds the noise level of the second broadcast.

6. The computer-implemented method of claim 1, wherein tuning the second receiver to the second broadcast includes:

searching a navigation profile for a preference corresponding to the specific program; and tuning the second receiver to the second broadcast if the second broadcast satisfies the preference and a comparison of the noise level of the first broadcast to the noise level of the second broadcast establishes the noise level of the first broadcast exceeds the noise level of the second broadcast.

7. The computer-implemented method of claim 1, further including synchronizing the second broadcast with the first broadcast, wherein the synchronizing includes writing at least one of the first broadcast and the second broadcast to a memory.

8. The computer-implemented method of claim 1, wherein detecting the switching event includes receiving a user request to locate the specific program on a station other than the first station.

9. The computer-implemented method of claim 1, wherein tuning the second receiver includes tuning the second receiver to the second broadcast including the specific program within the genre at a highest quality level available.

10. A computer program product comprising:

a non-transitory computer readable medium; and computer usable code stored on the computer readable medium, where, if executed by a processor, the computer usable code causes a computer to:

tune a first receiver of a portable radio to a first broadcast from a first station, the first broadcast to include a specific program within a genre with audio of an individual associated with the specific program;

detect a switching even at the portable radio that is to include a determination of one or more of a receipt of a user request to locate the specific program on a station other than the first station and a noise level of the first broadcast that is to indicate signal quality of the first broadcast is to exceed a noise switching threshold;

scan to detect a plurality of available broadcasts in response to the switching event;

conduct a comparison between an audio print of the available broadcasts and an audio print of the first broadcast based at least in part on the specific program within the genre with the audio of the individual to determine one or more closest matches;

generate a score based on the comparison;

add a selected broadcast to a preset list if the score is to exceeds a preset threshold to accumulate the one or more closest matches;

assign different colors to a plurality of station buttons based on the preset list to indicate a strength of match; and one or more of:

automatically tune a second receiver of the portable radio to a second broadcast from a second station in response to the switching event and based at least in part on the one or more closest matches and a comparison of a noise level of the first broadcast that is to indicate the signal quality of the first broadcast to a noise level of the second broadcast that is to indicate signal quality of the second broadcast, wherein the second broadcast has an audio print similar to an audio print of the first broadcast based at least in part on the specific program within the genre with the audio of the individual that is to be included in the first broadcast and the second broadcast; and tune the second receiver of the portable radio to the second broadcast from the second station in response to a request by a user via a user interface that is to prompt the user with one or more switching options that is to include an illumination of the plurality of station buttons with the different colors to indicate the strength of match.

11. The computer program product of claim 10, wherein the computer usable code, if executed, causes a computer to:

select a broadcast from the plurality of available broadcasts; and couple the selected broadcast to the first broadcast.

12. The computer program product of claim 11, wherein the computer usable code, if executed, further causes a computer to repeat the selecting, coupling, conducting, generating and adding for each broadcast in the plurality of available broadcasts.

13. The computer program product of claim 12, wherein the computer usable code, if executed, further causes a computer to illuminate a plurality of preset buttons with the different colors based on the preset list to indicate the strength of match.

14. The computer program product of claim 10, wherein the computer usable code, if executed, causes a computer to:

search an electronic program guide corresponding to for the specific program; and tune the second receiver to the second broadcast if the specific program is found in the electronic program guide and a comparison of the noise level of the first broadcast to the noise level of the second broadcast is to establish the noise level of the first broadcast exceeds the noise level of the second broadcast.

15. The computer program product of claim 14, wherein the computer usable code, if executed, further causes a computer to:

search a navigation profile for a preference corresponding to the specific program; and tune the second receiver to the second broadcast if the second broadcast satisfies the preference and a comparison of the noise level of the first broadcast to the noise level of the second broadcast is to establish the noise level of the first broadcast exceeds the noise level of the second broadcast.

16. The computer program product of claim 10, wherein the computer usable code, if executed, further causes a computer to synchronize the second broadcast with the first broadcast, wherein synchronization is to include a write of at least one of the first broadcast and the second broadcast to a memory.

17. The computer program product of claim 10, wherein the computer usable code, if executed, causes a computer to tune the second receiver to the second broadcast that is to include the specific program within the genre at a highest quality level available.

18. A computer program product comprising:

a non-transitory computer readable medium; and computer usable code stored on the computer readable medium, where, if executed by a processor, the computer usable code causes a computer to:

tune a first receiver of a portable radio to a first broadcast from a first station, the first broadcast to include a specific program within a genre with audio of an individual associated with the specific program;

detect a switching event at the portable radio that is to include a determination of one or more of a receipt of a user request to locate the specific program on a station other than the first station and a noise level of the first broadcast that is to indicate signal quality of the first broadcast is to exceed a noise switching threshold;

scan to detect a plurality of available broadcasts in response to the switching event;

select a broadcast from the plurality of available broadcasts;

couple the selected broadcast to the first broadcast;

conduct a comparison between an audio print of the selected broadcast and an audio print of the first broadcast based at least in part on the specific program within the genre with the audio of the individual to determine one or more closest matches;

generate a score based on the comparison;

add the selected broadcast to a preset list if the score exceeds a preset threshold to accumulate the one or more closest matches, wherein the audio print of the selected broadcast is similar to the audio print of the first broadcast based at least in part on the specific program within the genre with the audio of the individual that is to be included in the first broadcast and the selected broadcast;

repeat the selecting, coupling, conducting, generating and adding for each broadcast in the plurality of available broadcasts;

assign different colors to a plurality of station buttons based on the preset list to indicate a strength of match; and one or more of:

automatically tune a second receiver of the portable radio to the selected broadcast from the station other than the first station in response to a switching event and based at least in part on the one or more closest matches and a comparison of a noise level of the first broadcast that is to indicate the signal quality of the first broadcast to a noise level of the selected broadcast that is to indicate signal quality of the selected broadcast; and tune the second receiver of the portable radio to the selected broadcast from the second station in response to a request by a user via a user interface that is to prompt the user with one or more switching options that is to include an illumination of the plurality of station buttons with the different colors to indicate the strength of match.

19. The computer program product of claim 18, wherein the computer usable code, if executed, causes a computer to:

receive a user request to locate the specific program on a station other than the first station;

and tune the second receiver to the selected broadcast from the station other than the first station that is to include the specific program within the genre with the audio of the individual at a highest quality level available.

* * * * *